(12) United States Patent
Kim et al.

(10) Patent No.: US 6,214,430 B1
(45) Date of Patent: Apr. 10, 2001

(54) DISC RECORDING MEDIUM AND METHOD OF FABRICATING THE SAME

(75) Inventors: Soo Kyung Kim, Seoul; Seong Jin Park, Kyungki-do, both of (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/248,119

(22) Filed: Feb. 11, 1999

(30) Foreign Application Priority Data

Apr. 10, 1998 (KR) .................................. 98-12920
Oct. 24, 1998 (KR) .................................. 98-44936

(51) Int. Cl.⁷ ...................................... B32B 3/02
(52) U.S. Cl. ................. 428/64.1; 428/64.2; 428/64.4; 428/913; 430/270.1; 430/495.1; 430/945; 369/288; 156/282
(58) Field of Search .................. 428/64.1, 64.2, 428/64.3, 64.4, 913; 430/270.1, 495.1, 945; 369/288; 156/282; 427/375

(56) References Cited

U.S. PATENT DOCUMENTS

| | | | | |
|---|---|---|---|---|
| 5,538,774 | * | 7/1996 | Landin | 428/64.1 |
| 5,681,609 | * | 10/1997 | Kitayama | 427/129 |
| 5,725,931 | * | 3/1998 | Landin | 428/134 |
| 5,733,622 | * | 3/1998 | Starcke | 428/64.1 |
| 5,777,832 | * | 7/1998 | Yi | 360/135 |
| 5,972,461 | * | 10/1999 | Sandstrom | 428/64.3 |
| 5,987,003 | * | 11/1999 | Yokota | 369/280 |

FOREIGN PATENT DOCUMENTS

0507515 * 3/1992 (WO) .

* cited by examiner

*Primary Examiner*—Elizabeth Evans

(57) ABSTRACT

A disc recording medium that is capable of being rotated at a high speed to improve an information transfer rate. The recording medium has a residual stress acting as a tensile force. An annular reinforcing member having a temperature coefficient different from the disc and adapted to be bonded to the disc is used in the recording medium.

22 Claims, 11 Drawing Sheets

DISC RECORDING MEDIUM AND METHOD OF FABRICATING THE SAME

BACKGROUND OF THE INVENTION

1. Field of the Invention

This invention relates to a recording medium for recording an information, and more particularly to a disc recording medium that is capable of being rotated at a high speed.

2. Description of the Prior Art

Generally, a recording medium for recording an audio information, a video information and a binary information for a computer, etc. has been manufactured in a disc type or a tape cassette type. A disc type of recording medium, hereinafter referred to as "disc recording medium", has been more spotlighted than a tape cassette type of recording medium in that an information is randomly accessed in the high speed. Nowadays, as such a disc recording medium has prevailed a hard disc, an optical disc, a magneto-optical disc and so on. These discs have a very large capacity and high density tracks to record a large amount of information. Also, the disc recording medium has been required to transfer a lot of information at a high speed, that is, to permit high-speed recording and reproduction of an information. The disc recording medium must be rotated at a high speed for a high-speed transfer of information.

A disc is influenced by an exterior interference such as air resistance due to a flow of air occurring upon its rotation. Accordingly, a vibration called a disk flutter is generated at the rotating disc depending on the driving condition of a driver and the state of the disc. In the disc driver, if the disc flutter is larger above the limit value, a head or a pick-up fails to trace signal tracks on the disc accurately to prevent an information from being recorded or reproduced. Because such a disc flutter becomes larger as a disc is rotated at a higher speed, the disc must be rotated below a speed of allowing an access of information. In other words, the disc must be rotated below the limit speed to disappear the disc flutter, the accurate information recording and reproducing can be secured. Accordingly, it is difficult to provide a recording and reproducing speed, that is, a transfer rate of information in the disc above a constant limit speed. Such a limit speed is called as a critical speed and the disc rotates unstably at the critical speed. Due to this, although the disc has a larger capacity and higher density tracks, the rotating speed of the disc is limited at the critical speed.

SUMMARY OF THE INVENTION

Accordingly, it is an object of the present invention to provide a disc recording medium that is capable of being rotated at a high speed, and a fabricating method thereof.

In order to achieve these and other objects of the invention, a disc recording medium according to one aspect of the present invention has a residual stress acting as a tensile force. The disc recording medium includes a disc, and a reinforcing member having a thermal expansive coefficient different from the disc and adapted to be bonded to the disc. The reinforcing member is bonded to the inner circumference or the outer circumference of the disc.

A disc recording medium according to another aspect of the present invention comprises having an outer circumference cooled in temperature lower than an inner circumference to obtain a residual stress acting as a tensile force.

A method of fabricating a disc recording medium according to another aspect of the present invention includes the steps providing a disc and a reinforcing member; and bonding the reinforcing member to the outer circumference of the disc to allow a radial tensile force to be applied to the disc.

A method of fabricating a disc recording medium according to another aspect of the present invention includes the steps of pressurizing a molten substrate material to mold a disc; and suddenly cooling a part of the disc and, at the same time, slowly cooling the remaining part of the disc. In the disc cooling step, the outer circumference of the disc is suddenly cooled.

An apparatus for fabricating a disc recording medium according to another aspect of the present invention includes: a stationary plate; a moving plate; cooling means installed at any one of the stationary and moving plates, the cooling means cooling a part of the disc different from the rest of the disc in the cooling speed, the cooling temperature and the cooling order.

A moving plate for pressurizing a molten substrate material onto the moving plate to mold a disc; and cooling means for suddenly cooling a part of the disc.

BRIEF DESCRIPTION OF THE DRAWINGS

These and other objects of the invention will be apparent from the following detailed description of the embodiments of the present invention with reference to the accompanying drawings, in which.

DETAILED DESCRIPTION OF THE PREFERRED EMBODIMENT

Figure 1:
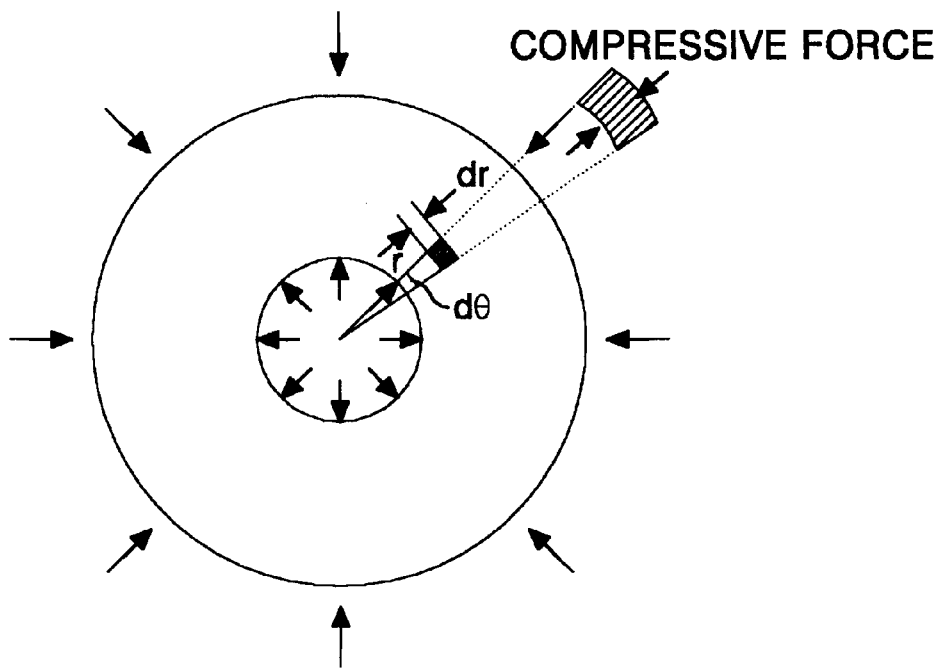
FIG. 1 depicts a state in which a compressive force is applied to a disc in its radial direction.
Figure 2:
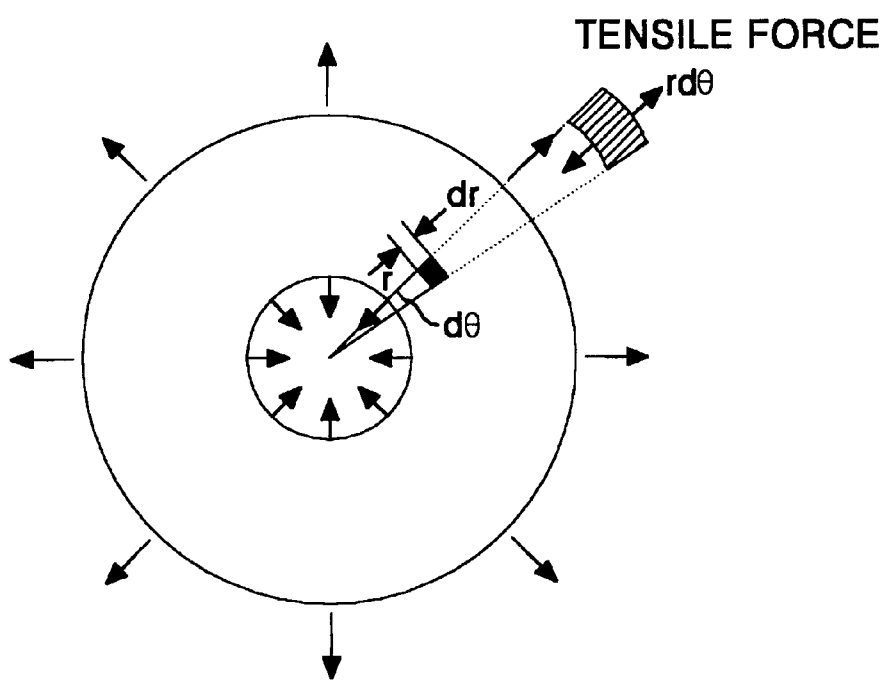
FIG. 2 depicts a state in which a tensile force is applied to a disc in its radial direction.

A technical spirit of the present invention was conceived from experiments as to a variation in a vibration amount on the frequency axis with respect to an exterior interference and a vibration characteristic of disc with respect to a residual stress. In the experiment on a vibration characteristic of disc was used a disc having a thickness of 0.6 mm and a diameter of 120 mm and having a inner circumference secured by a clamper. The responsive characteristics of the disc is measured in which a unit impact force (for example, 1 mN) was applied at a place on the disc (for example, at r=50 mm). Furthermore, the disc was rotated in a state in which no force is applied in its radial direction, in a state in which a tensile force is applied in its radial direction as shown in FIG. 1, and in a state in which a compressive force is applied in its radial direction. Generally, there is appeared that a vibration amount in the disc becomes different depending on an exterior interference frequency. This is called a frequency responding characteristics, and a specific exterior interference frequency appearing a largely vibration in the disc is a mode frequency. In the experiments, the disc has mode frequencies generating a serious vibration. This results from the disc being resonated at each mode frequency. Further, the experiment shows that a vibration characteristic of disc becomes different depending upon whether a force existing in the radial direction exists as well as depending upon a pattern of the force extorting in the radial direction. This fact will be apparent from vibration characteristics on the frequency axis with respect to an exterior interference as shown in FIG. 3A to FIG. 5B.

Figure 3A:
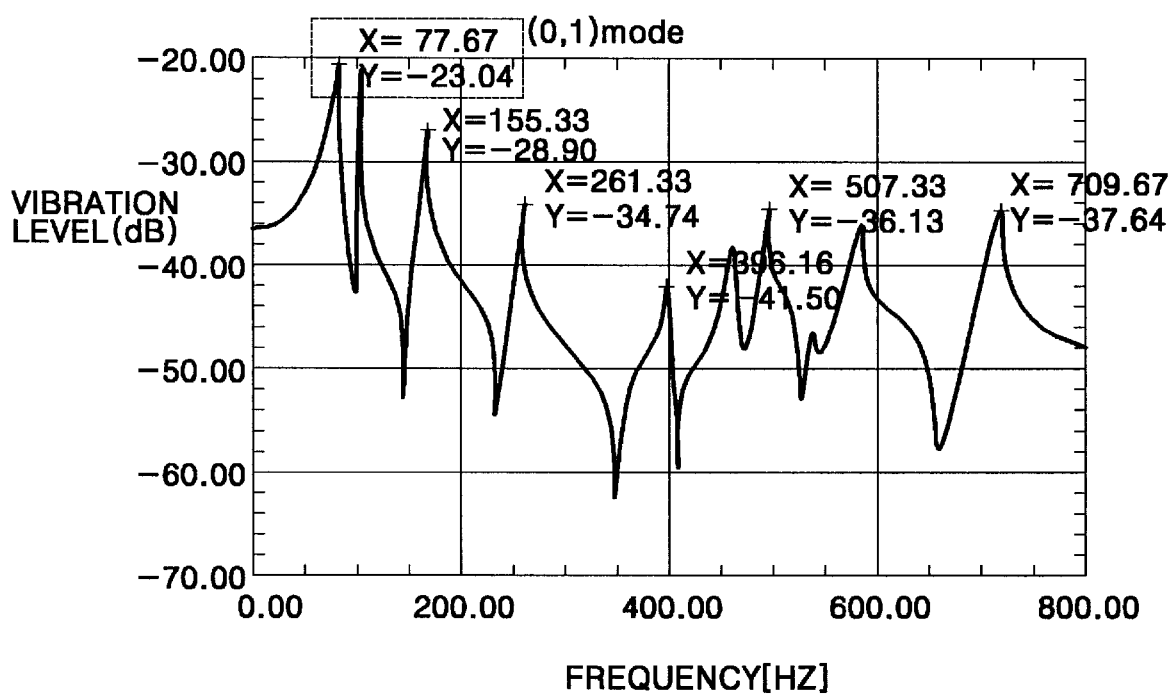
FIG. 3A represents a disc vibration characteristic of disc on the frequency axis with respect to an exterior interference when a disc, to which any force are not applied, is rotated.
Figure 3B:
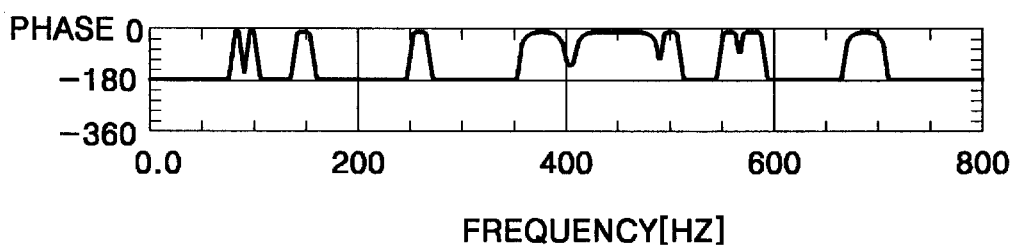
FIG. 3B represents a phase characteristic of disc vibration on the frequency axis with respect to an exterior interference when a disc, to which any forces are not applied, is rotated.

FIG. 3A shows the variation of a vibration amount for the number of native vibrations of a disc in which no force is applied in its radial direction. In FIG. 3A, the disc has mode frequencies of 77.67 Hz, 155.33 Hz, 261.33 Hz, 396.16 Hz, 507.33 Hz and 707.67 Hz, and the disc vibration amount has −23.04 dB, −28.90 dB, −34.74 dB, −41.50 dB, −36.13 dB and −37.64 dB at the respective mode frequencies. Also, a phase in the disc vibration changes suddenly at the respective mode frequencies as shown in FIG. 3B. It can be seen from FIG. 3A and FIG. 3B that the disc having the above-mentioned mode frequencies resonates at (0,1), (0,0), (0,2) and (0,3) mode frequencies(i.e., 77.67 Hz, 155.33 Hz, 396.16 Hz and 507.33 Hz) when the exterior interference of the above-mentioned mode frequencies are force thereto. Particularly, a mode frequency generating the largest vibration amount of −23.34 dB and the most sudden phase change is the (0.1) mode frequency (i.e., 77.67 Hz). In the (0.1) mode frequency, the left half and the right half of the disc having a positive displacement and a negative displacement, respectively. When a recording or reproduction of information is performed in a state in which the disc is rotated in the (0,1) mode frequency along with in (0,2) and (0,3) mode frequencies, a probability of error occurrence becomes largest.

Figure 4A:
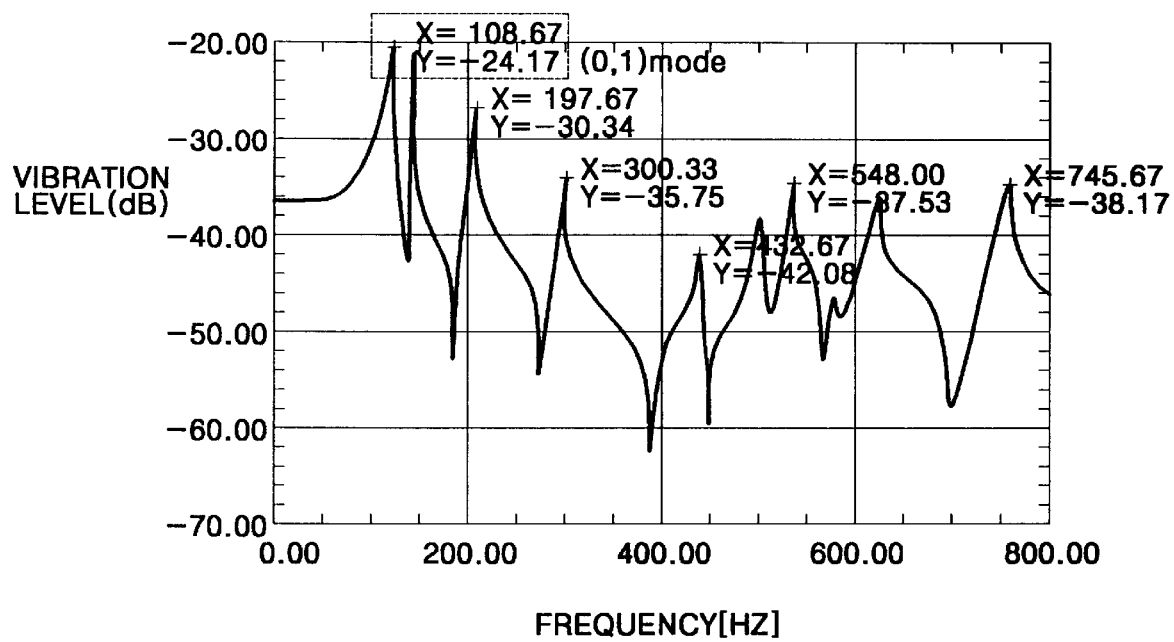
FIG. 4A represents a vibration characteristic of disc vibration on the frequency axis with respect to an exterior interference when the disc, to which a tensile force is applied in its radial direction, is rotated.
Figure 4B:
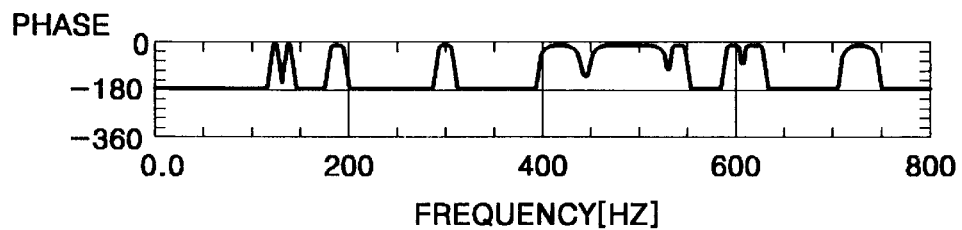
FIG. 4B represents a phase characteristic of disc vibration on the frequency axis with respect to an exterior interference when a disc, to which a tensile force is applied in its radial direction, is rotated.

FIG. 4A represents a variation of a vibration amount for the number of native vibrations of disc in which a tensile force of 0.14 Mpa in its radial direction. In FIG. 4A, the disc has mode frequencies of 108.67 Hz, 197.67 Hz, 300.33 Hz, 432.67 Hz, 548.00 Hz and 745.67 Hz, and a disc vibration amount has values of −24.17 dB, −30.04 dB, −35.75 dB, −42.08 dB, −37.53 dB and −38.17 dB at the respective mode frequencies. Also, a phase in the disc vibration changes suddenly at the above-mentioned frequencies as shown in FIG. 4B. A disc applied with a tensile force in its radial direction has higher mode frequencies and a smaller vibration at the respective mode frequencies, compared with a disc applied with no force. For example, the (0,1) mode frequency shown in FIG. 4A becomes higher, by 41 Hz, than that shown in FIG. 3A. Also, a vibration amount at the (0.1) mode frequency shown in FIG. 4A becomes lower, by 1.13 dB, than that shown in FIG. 3A. This result from that the disc, to which a tensile force is applied, enlarges its internal stiffness to increase its internally potential energy resisting to the exterior interference. In other words, the mode frequencies of the disc are higher according to the enhancement of stiffness resisting to the exterior interference.

Figure 5A:
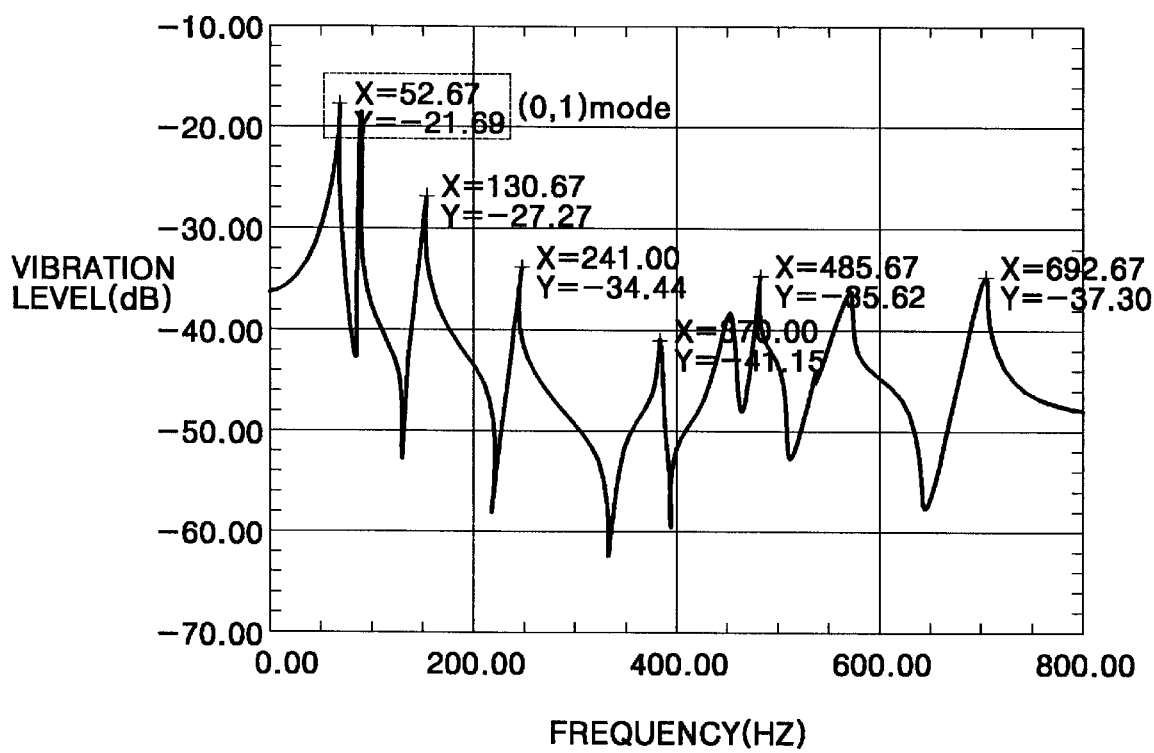
FIG. 5A represents a vibration characteristic of disc vibration on the frequency axis with respect to an exterior interference when the disc, to which a compressive force is applied in its radial direction, is rotated.
Figure 5B:
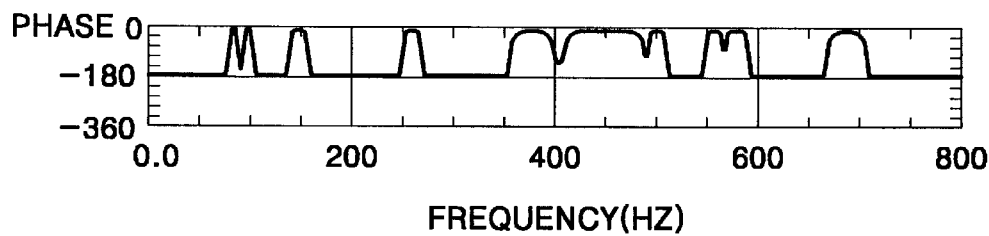
FIG. 5B represents a phase characteristic of disc vibration on the frequency axis with respect to an exterior interference when a disc, to which a compressive force is applied in its radial direction, is rotated.

FIG. 5A represents a variation of a disc vibration amount for the number of native vibrations of a disc being applied with a compressive force of 0.07 Mpa in its radial direction. In FIG. 5A, the disc has mode frequencies of 52.67 Hz, 130.67 Hz, 241.00 Hz, 370.00 Hz, 487.67 Hz and 692.67 Hz, and a disc vibration amount has values of −21.27 dB, −27.27 dB, −34.34 dB, −41.15 dB, −35.62 dB and −37.30 dB at the respective mode frequencies. Also, a phase in the disc vibration changes suddenly at the above-mentioned frequencies as shown in FIG. 5B. A disc applied with a compressive force in its radial direction has lower mode frequencies and a larger vibration at the respective mode frequencies, compared with a disc applied with no force. For example, the (0,1) mode frequency shown in FIG. 5A becomes higher, by 20 Hz, than that shown in FIG. 3A. Also, a vibration amount at the (0.1) mode frequency shown in FIG. 5A becomes larger, by 1.35 dB, than that shown in FIG. 3A. This result from that the disc, to which a compressive force is applied, decreases its internal stiffness to be lower its mode frequency.

The vibration characteristics shown in FIG. 3A to FIG. 5A shows that the vibrating level of disc is higher in which most of the exterior interference components making an effect on the rotating disc(e.g., an eccentricity in a motor for rotating the disc, an air resistance caused by a flow of air and so on) are distributed at a low frequency, than at a high frequency. Also, a vibration or flutter) becomes large in the case of a disc having a mode frequency included in the exterior interference frequency band; while becoming small in the case of a disc having a higher mode frequency than the exterior interference frequency band. In other word, a disc vibration(or flutter) upon rotation is more restrained as a mode frequency of the disc becomes higher. As a result, if a mode frequency of the disc becomes high, then the disc can be rotated above the limit speed. Accordingly, an information transfer rate of the disc also can be made fast above the limit speed. In other words, as a mode frequency of the disc becomes high, an information recording and reproduction onto and from the disc can be performed above the limit speed.

Further, it can be seen from variation characteristics shown in FIG. 3A to FIG. 5A that a mode frequency of the disc becomes high when a tensile force is applied to the disc in its radial direction. In other words, a disc vibration(or flutter) is suppressed by applying a tensile force to the disc in its radial direction. As a result, the disc can be not only rotated above the limit speed, but also an information transfer rate can be improved above the limit speed.

In view of this experiment result, there was suggested a disc recording medium in which a tensile force can be applied to the disc in its radial direction. In a disc recording medium according to the present invention, a tensile force applied to the disc in its radial direction is derived form the residual stress. In other words, a residual stress applied to the disc in the radial direction taking a type of tensile force exists in the disc recording medium according to the present invention. Such a disc recording medium will be more apparent from a detailed explanation as to embodiments of the present invention.

Figure 6:
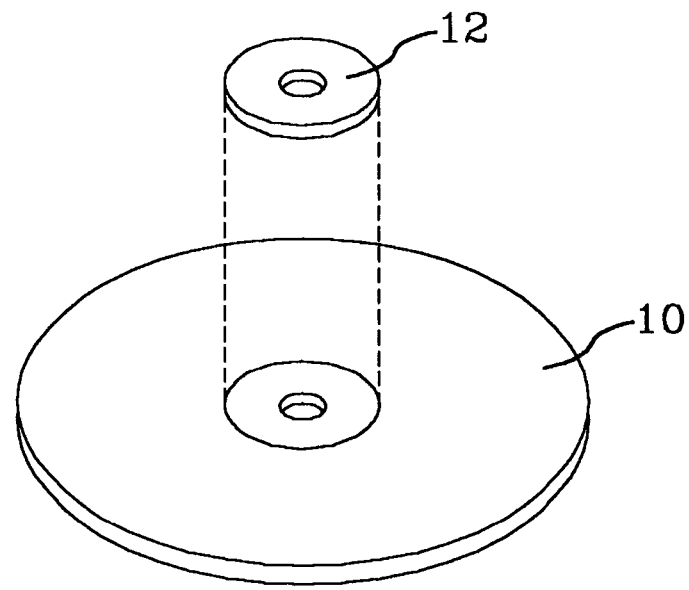
FIG. 6 is an exploded perspective view of a disc recording medium according to an embodiment of the present invention.

Referring now to FIG. 6, there is shown a disc recording medium according to an embodiment of the present invention. The disc recording medium includes a reinforcing member 12 installed at the center of a disc 10. The disc 10 is made from poly-carbonate. The reinforcing member 12 occupies a clamping area corresponding to a non-recording region. The reinforcing member 12 is bonded to the inner circumference of the disc 10 at the normal temperature (generally, 20° C.) in a state of heating it into a bonding temperature higher than the normal temperature(generally, 20° C.). The reinforcing member 12 bonded at the center of the disc 10 in this manner is contracted as a temperature becomes low, thereby generating a residual stress pulling the disc 10 into the center. In other words, the reinforcing member 12 produces a residual stress applying a radial tensile force to the disc 10. In order to enlarge the radial tensile force, the reinforcing member 12 may be made from a certain material having a larger thermal expensive coefficient than the disc 10, but preferably from a material identical to the disc 10.

Figure 7:
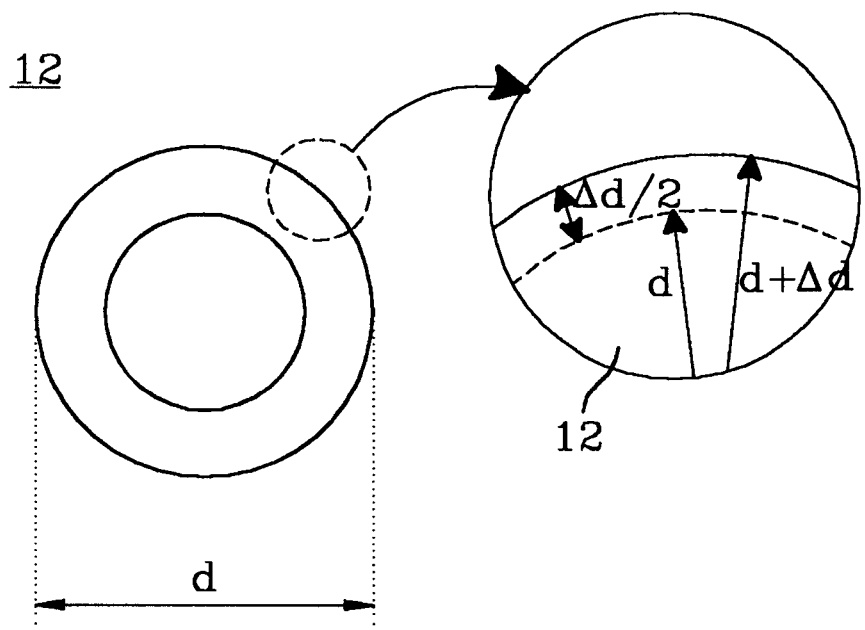
FIG. 7 is a detailed view of the reinforcing member shown in FIG. 6.

FIG. 7 explains a process of producing a residual stress by means of the reinforcing member 12. In FIG. 7, "d" represents a diameter of the reinforcing member 12 at the normal temperature, and "d+Δd" does a diameter of the reinforcing member 12 heated into a bonding temperature t1 higher than the normal temperature. In other words, if the reinforcing member 12 is heated into the bonding temperature t1, then a radius of the reinforcing member 12 is enlarged by "Δd". As the reinforcing member 12 bonded to the inner circumference of the disc 10 in a state of being heated into the bonding temperature t1 is cooled, a contracting action is caused to reduce the diameter thereof. This contracting action of the reinforcing member 12 derives a residual stress allowing the disc 10 to be drawn toward the center of the disc 10, that is, a radial tensile force. In order to allow a constant magnitude of residual stress to exist in the disc recording medium, the reinforcing member 12 may be bonded to the inner circumference of the disc 10 when it was cooled into the bonding temperature t1 after being heated into a certain temperature t2 higher than the bonding temperature t1.

As described above, In the embodiment according to the present invention, the vibration or flutter is reduced by the residual stress as the tensile force to pulling the disc toward the outside of the disc.

Figure 8:
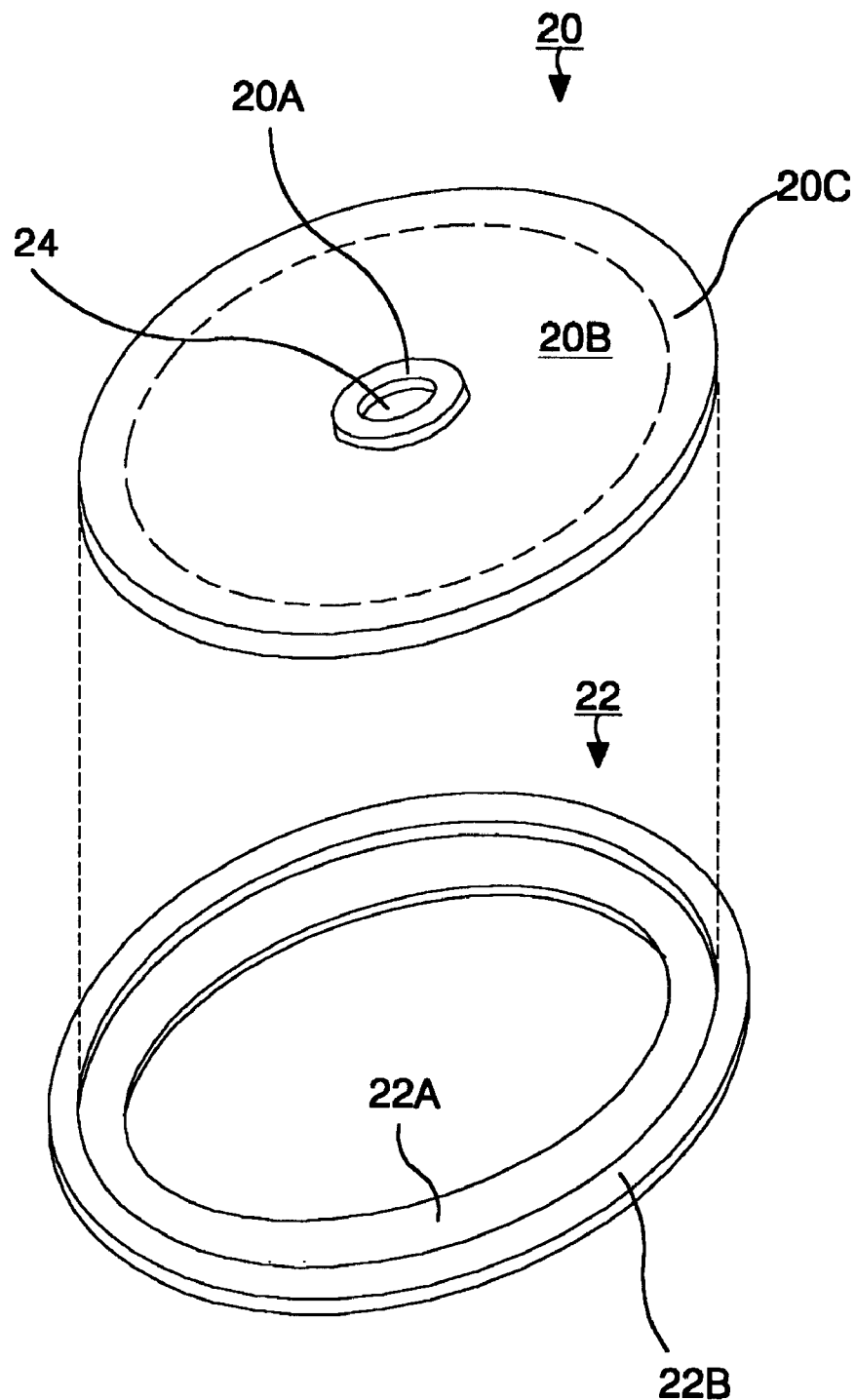
FIG. 8 is an exploded perspective view of a disc recording medium according to another embodiment of the present invention.

Referring to FIG. 8, there is shown a disc recording medium according to another embodiment of the present invention. The disc recording medium includes a reinforcing member 22 installed at the outer circumference of a disc 20. The center of the disc 20 is provided with a through hole 24. A rotation axis of a motor, not shown, is inserted to the through hole 24. The disc 20 is divided into a clamping region 20A, a recording region 20B and a non-recording region 20C. The clamping region 20A positioned at the inner circumference of the recording region 20B is secured onto the turntable by means of a clamper(not shown) included in a disc driver. Such a clamping region 20A is formed to have twice the thickness of the recording region 20B and the non-recording region 20C. For example, when each thickness of the recording and non-recording regions 20B and 20C is "t", the clamping region 20A has a thickness of "2t". Otherwise, the clamping region 20A may be formed to have the same thickness as each of the recording and non-recording regions 20B and 20C. The recording region 20B positioned between the clamping region 20A records an information. The recording region 20B has marks such as pits in case that the disc is used for a read only recording medium, and is coated with a recording material layer when the disc is used for a recordable recording medium. The reinforcing member 22 is extended in the perpendicular direction from the outer circumference of a base ring 22A, and is provided with an annular protrusion 22B having a certain thickness "t". The base ring 22A is adhered to the outer circumference edge of the disc 20 and, at the same time, the protrusion 22B is adhered to the outer circumference surface of the disc 20, thereby coupling the reinforcing member 22 with the disc 20 in such a manner to receive the circumference of the disc 20. The reinforcing member 22 coupled with the outer circumference of the disc 20 in this manner generates a force pulling the disc 20 toward the outside, that is, a tensile force. The outer circumference of the disc 20 is coupled with the reinforcing member 22 by means of an adhesive agent, but may be coupled by other method. In order to produce the tensile force, the reinforcing member 22 is adhered to the outer circumference of the disc before being placed upon the air, in which the reinforcing member 22 is at the temperature lower than that of the disc 20. It is probable that a thermal expansive coefficient of disc 20 is enlarged than that of the reinforcing member 22. Methods for being higher the temperature of the disc 20 relative to that of the reinforcing member 22 just before adhering the disc 20 and reinforcing member 22 will be described. Firstly, it is a method that the temperature of the disc 20 is established above normal temperature and the reinforcing member 22 is at the normal temperature. Secondly, the temperature of the disc 20 is set to the normal temperature and the reinforcing member 22 is established below the normal temperature. Finally, the disc 20 has the temperature above normal temperature and the temperature of the reinforcing member 22 is set to below the normal temperature. There is followed the detailed description of an embodiment according to the present invention which the final method is adapted.

Figure 9:
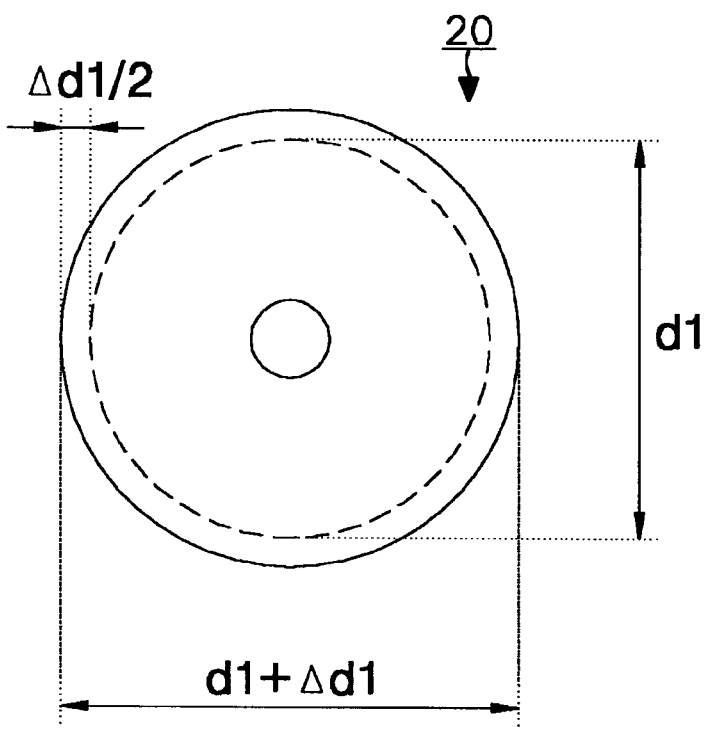
FIG. 9 is a detailed view of the disc shown in FIG. 8.

FIG. 9 explains a state in which the disc 20 shown in FIG. 8 is expanded in accordance with a temperature. Referring to FIG. 9, the disc 20 has a diameter d1 from the center into the dotted circle line at the normal temperature(i.e., 20° C.). When the disc 20 is heated into a temperature(i.e., 70° C. to 80° C.) higher than the normal temperature by the first desired temperature $\Delta T1$(e.g., 50° C. to 60° C.), then the disc 20 is expanded. In other words, the disc 20 is expanded by a region ranged from the dotted line into the solid line. Accordingly, a diameter of the disc 20 is enlarged by "Δd1", and hence a radius of the disc 20 is enlarged by "Δd1/2". The disc 20 having a temperature increased by the first desired temperature ΔT1 from the normal temperature has a diameter of "d1+Δd1".

Figure 10:
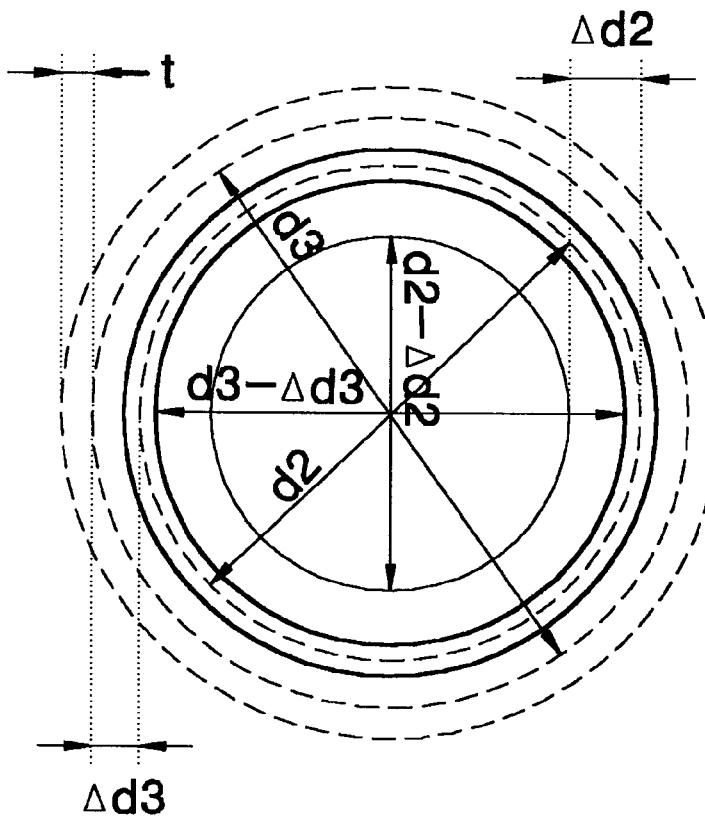
FIG. 10 is a detailed view of the reinforcing member shown in FIG. 8.

FIG. 10 explains a state in which the reinforcing member 22 shown in FIG. 8 is contracted in accordance with a temperature. Referring to FIG. 10, the reinforcing member 22 has such a dimension as indicated by the dotted line at the normal temperature. More specifically, the base ring 22A and the protrusion 22B of the reinforcing member 22 has inner diameters of "d2" and "d3" at the normal temperature (i.e., 20° C.), respectively. If the reinforcing member 22 is cooled into a temperature(i.e., 0° C. to −10° C.) lower than the normal temperature by the second desired temperature ΔT2(e.g., −20° C. to −30° C.), then the reinforcing member 22 is contracted to have a dimension indicated by the solid circle line. In this case, the base ring 22A of the reinforcing member 22 has an inner diameter of "d2−Δd2" while the protrusion 22B of the reinforcing member 22 has an inner diameter of "d3−Δd3". When the reinforcing member 22 is cooled by the second desired temperature ΔT2 from the normal temperature, the base ring 22A has a radius decreased by "Δd2/2" and the protrusion 22B has a radius decreased by "Δd3/2". In this case, a variation amount in the thickness of the protrusion 22B can be disregard because it is very small compared with the decreased amount Δd3 in the inner diameter thereof.

Figure 11A:
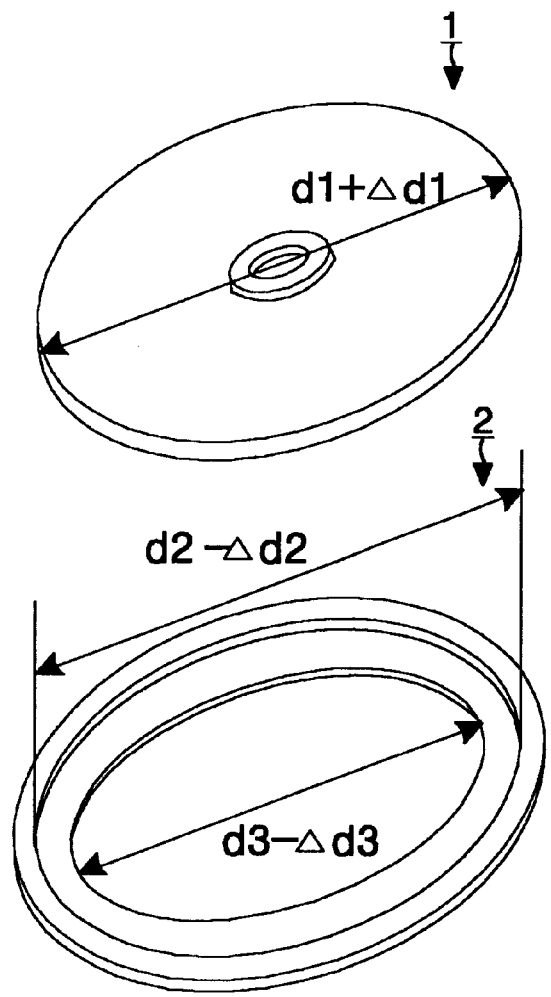
FIG. 11A depicts a joined state of the disc and the reinforcing member.
Figure 11B:
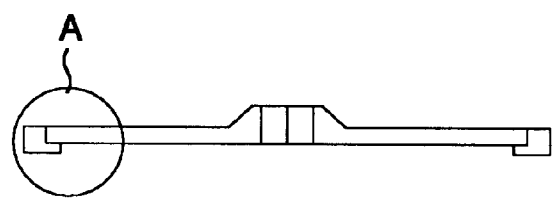
FIG. 11B is a sectional view of a disc recording medium according to another embodiment of the present invention.
Figure 11C:
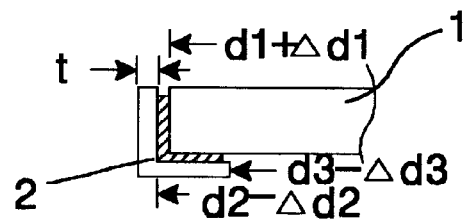
FIG. 11C is a detailed view of the A portion in FIG. 11A.

The disc 20 and reinforcing member 22 created by the above mentioned method are bonded to each other in which those diameters are increased and decreased, as shown in FIG. 11B. FIG. 11A shows the disc and reinforcing member 22 at the time bonding. In FIG. 11A, the diameter of the disc with d1+Δ1 is equal to the diameter of the reinforcing member 22 having d2+Δd2. FIG. 11C is a sectional view of a bonded portion "A" shown in FIG. 11A.

Figure 12:
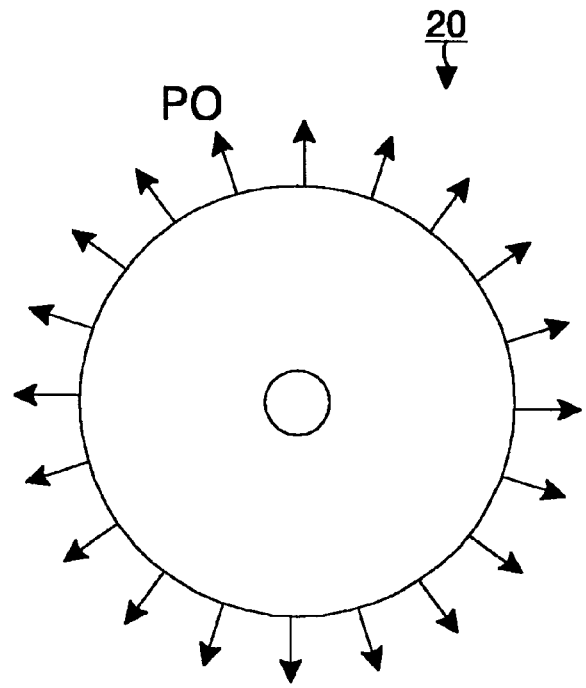
FIG. 12 represents a force exerting on the disc shown in FIG. 8.

When each temperature of the disc 20 and the reinforcing member 22 bonded to each other as described above is returned into the normal temperature, a residual stress intended to pull the disc 20 toward the outside thereof(i.e., the circumference thereof), that is, a tensile force PO as shown in FIG. 12 is produced at the disc 20. Otherwise, a residual stress intended to pull the reinforcing member 22 toward the center thereof, that is, a compressive force PI is produced at the reinforcing member 22. At the bonded surface of the disc 20 and reinforcing member 22, the tensile force PO and the compressive force PI are cancelled each other to appear the balance state of forces. Consequently, the tensile force pulling the disc 20 toward outside is existed in the disc 20. The tensile force increases the internally potential energy of the disc 20 in such a manner that the mode frequency of a disc recording medium is higher than the frequency band of the exterior interference, thereby restrain a vibration upon rotation of the disc recording medium. As a result, in the disc recording medium, it is can not only be rotated above the limit speed as well as, but also the recording and reproducing operation of information can be performed above the limit speed.

Figure 14:
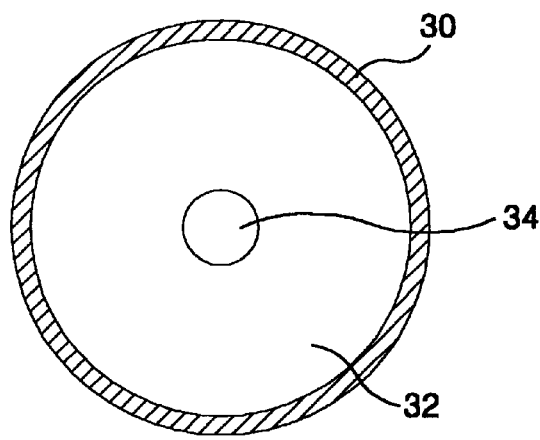
FIG. 14 is a schematic view of a disc recording medium according to still another embodiment of the present invention.

Referring to FIG. 14, there is shown a disc recording medium according to still another embodiment of the present invention. The disc recording medium includes a reinforcing member 30 with an annular ring shape, and a base 32 surrounded by the reinforcing member 30. A through hole 34 is formed at the center of the base 32. The reinforcing member 30 and the base 32 is made from the same material of poly-carbonate. The reinforcing member 30 is formed by suddenly cooling it from a high temperature into a lower temperature(conventionally, about 60 to 70° C.) than the temperature of the base 32 upon its manufacturing, whereas the base is formed by slowly cooling it from the normal temperature into the normal temperature.

Figure 13:
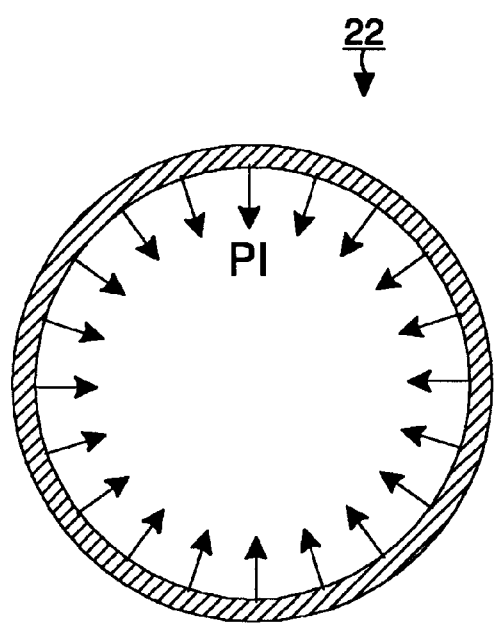
FIG. 13 represents a force exerting on the reinforcing member shown in FIG. 8.

The reinforcing member 30 formed in this manner allows the base to be continuously pulled toward the outside thereof. In other words, the reinforcing member 30 allows a radial tensile force PO orienting toward the circumference as shown in FIG. 12 to be applied to the base 32. On the contrary, the base 32 allows the reinforcing member 30 to be continuously pulled toward the center thereof. In other words, the base 32 allows a compressive force PI orienting toward the center as shown in FIG. 13 to be applied to the reinforcing member 30. Since the tensile force PO and the compressive force PI are exerted in a direction opposite to each other and have the same intensity, the equilibrium state of force appears at the boundary portion of the reinforcing member 30 and the base 32. As a result, a residual stress is almost constantly maintained in the radial direction of the disc recording medium according to still another embodiment of the present invention. Since a residual stress in the radial direction of the disc recording medium as described above is maintained constantly, a vibration is suppressed at the disc recording medium according to the present invention. Accordingly, in the disc recording medium according to still another embodiment of the present invention, it can not only be rotated above the limit speed, but also the recording and reproducing operation can be performed above the limit speed.

Figure 15:
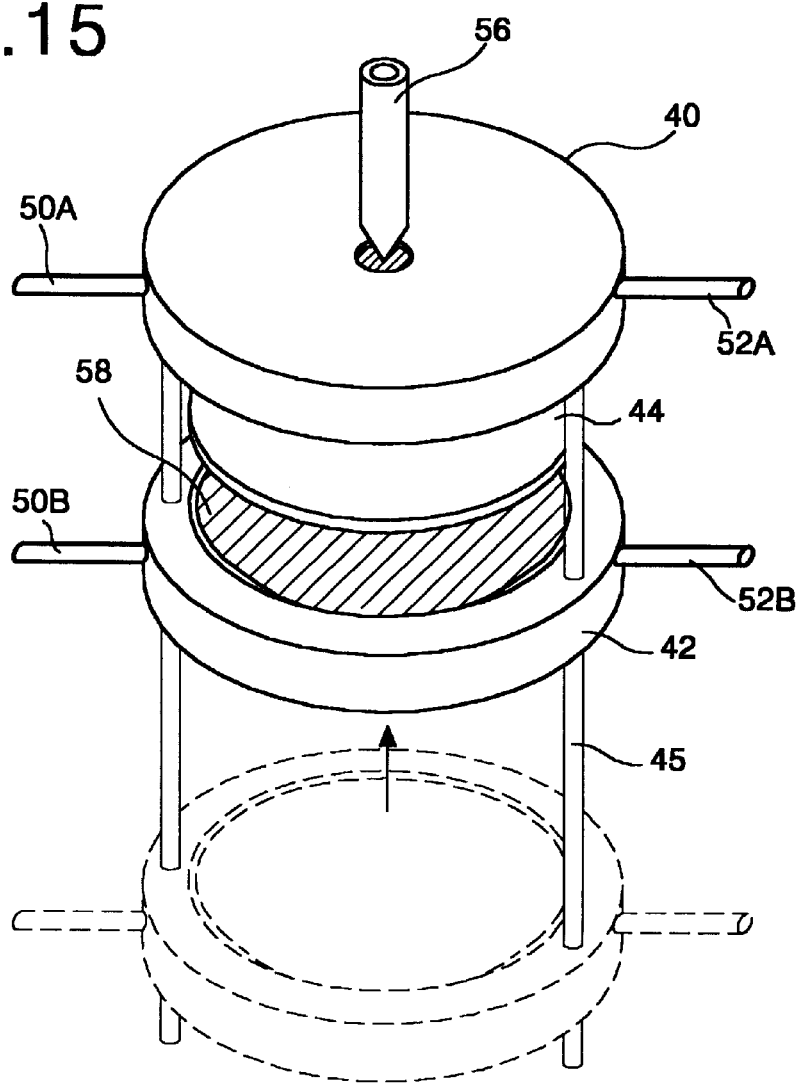
FIG. 15 is a schematic view of a fabricating apparatus for a disc recording medium according to an embodiment of the present invention.
Figure 16:
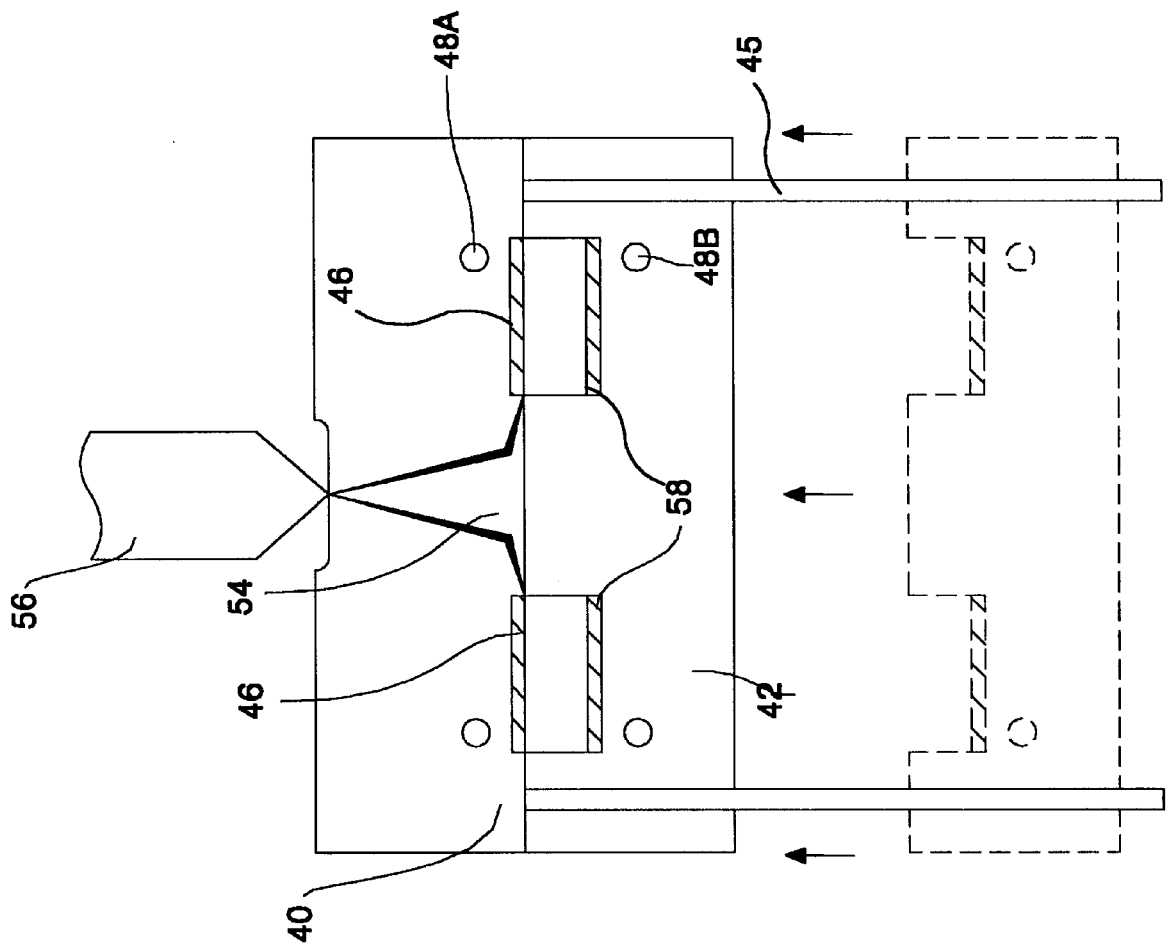
FIG. 16 is a sectional view of the fabricating apparatus shown in FIG. 15.

FIG. 15 illustrates a disc molding apparatus according to an embodiment of the present invention for molding the disc recording medium as shown in FIG. 14, and FIG. 16 is a sectional view of the disc molding apparatus shown in FIG. 15. Referring to FIGS. 15 and 16, the disc molding apparatus includes a stationary plate 40 opposite to a moving plate 42. The stationary plate 40 has a stamper 46 installed under its own and a first cooling channel 48A located at the upper and outer circumference of the stamper 46. The first cooling channel 48A is connected with a first inlet 50A and a first outlet 52A. The first inlet 50A applies cooling water or cooling oil to the first cooling channel 48A. The first outlet 52A evacuates the cooling water or cooling oil from the cooling channel 48A to the outside. Also, a sprue 54 is provided to the center of the stationary plate 40, and an injector 56 is disposed on the stationary plate 40. The injector 56 injects a molten disc material(for example, poly-carbonate) into the sprue 54. To this end, the injector 56 can have a screw (not shown). The sprue 54 guides the molten disc material from the injector 56 downward the stamper 46. Meanwhile, the moving plate 42 reciprocates along shafts 45 guiding a moving path. The moving plate 42 has a mirror block 58 installed on its surface and a second cooling channel 50B formed under the outer circumference of the mirror block 58. The mirror block 58 locates on the concave 42A provided to the surface of the moving plate 42 to oppose the stamper 46. Accordingly, a cavity is created between the stamper 46 and mirror block 58 when the moving plate 42 contacts closely with the stationary plate 40. The molten disc material is applied to the cavity (i.e., the concave 42A). Then, the cavity 42A is then full with the molten disc material. The molten disc material into the cavity 42A is pressurized to take the shape of a disc. The second cooling channel 48B is connected with a second inlet 50B and a second outlet 52B. The second inlet 50B supplies the cooling water or oil to the second cooling channel 48B. The second outlet 52B evacuates the cooling water or cooling oil from the cooling channel 48B to the outside. The cooling water or the cooling oil flows continuously within each of the first and second cooling channels 48A and 48B while the molten disc material is pressed. By the cooling water or cooling oil, a part of the molten disc material below the outer circumference of the stamper 46 is suddenly cooled into less than the base 32, i.e., into about 60 to 70° C. On the other hand, the rest of the molten disc material positioned below the inner circumference of the stamper 46 is slowly cooled. The molten disc material is cooled in a pressurized state as described above to mold the disc 44 as shown in FIG. 14. The disc 44 has the base 30 surrounded with the annular ring shape of the reinforcing member 32. A process of molding such a disc 44 will be described step by step below.

First, the molten disc material from the injector 56 is supplied between the stamper 46 and the mirror block 56 via through the sprue 54. Then, the molten disc material is pressurized with the stamper 46 and the mirror block 56. A disc material positioned at the edge of the stamper 46 and mirror block 56 in the pressurized disc material is suddenly cooled into about 60 to 70° C. by a cooling water or a cooling oil passing through the first and second cooling channels 48A and 48B. At this time, a disc material positioned at the inner circumference of the stamper 46 and the mirror block 56 is slowly cooled by the atmosphere. The disc material is cooled in this manner, thereby molding a disc 44 having the base 32 surrounded by the annular reinforcing member 30. A reflective material layer, a recording material layer and a protective material layer are deposited on the disc 44 molded in the above-mentioned manner to thereby fabricate a disc recording medium according to the present invention. Such a disc molding apparatus can easily manufacture a disc in which a radial tensile force appears in a shape of residual stress and can make the disc in the integral shape.

Alternatively, when the first and second cooling channels 48A and 48B shown in FIG. 16 is installed at the center(i.e., innermost circumference) of the stamper 46 and the innermost circumference of the mirror block 56, respectively, the reinforcing member 30 is formed at the innermost circumference of the disc 44 and the base 32 is formed to surround the reinforcing member 30. In this case, a tensile force orienting toward the center appears in the disc recording medium as a residual stress.

In the disc molding apparatus, a plurality of cooling channels having a same diameter can be arranged as the concentric circles. The temperature of a cooling water or a cooling oil flowing within each of the cooling channels varies gradually according to the radius of the stamper 46 and the mirror block 56. In detail, the cooling water or the cooling oil into the cooling channel positioned at a most outer circumference of the stamper 46 and the mirror block 56 is set at most lower temperature. Also, the cooling water or the cooling oil goes gradually high in accordance with proceeding toward inner circumference of the stamper 46 and the mirror block 56. On the other hand, the speed of cooling water or the cooling oil flowing within each of the cooling channels can vary gradually according to the radius of the stamper 46 and the mirror block 56. In other words, the cooling water or the cooling oil flows rapidly into the cooling channel positioned at a most outer circumference of the stamper 46 and the mirror block 56. The flowing speed of cooling water or the cooling oil slow gradually down in accordance with proceeding toward inner circumference of the stamper 46 and the mirror block 56.

Furthermore, a plurality of cooling channels each having different diameter can be arranged as the concentric circles. In other words, the cooling channel positioned at a most outer circumference of the stamper 46 and the mirror block 56 has a larger diameter. Also, the diameter of the cooling channels goes gradually small in accordance with proceeding toward inner circumference of the stamper 46 and the mirror block 56.

As described above, in the disc recording medium according to the present invention, a radial tensile force exists in a type of residual stress to cancel a stress caused by the exterior interference such as a centrifugal force and the like. Accordingly, a vibration is suppressed when the disc recording medium according to the present invention is rotated. As a result, the disc recording medium according to the present invention is capable of being rotated above the limit speed as well as performing the recording and reproducing of information above the limit speed.

Furthermore, in the disc molding apparatus and method according to the present invention, a part of the pressurized disc material is suddenly or slowly cooled to thereby easily manufacture the disc recording medium in which a radial tensile force appears in a shape of residual stress. Also, the disc molding apparatus and method according to the present invention is capable of manufacturing a disc recording medium having a residual stress in an integral shape.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. A disc recording medium having a residual stress acting as a tensile force which is generated by cooling a first portion of the disc as a first rate, and a second portion of the disc at a second rate during fabrication.

2. A disc recording medium comprising:
   a disc having a residual stress acting as a tensile force; and
   an annular reinforcing member having a thermal expansive coefficient different from that of the disc, said reinforcing member being adapted to be bonded to the disc.

3. The disc recording medium as claimed in claim 2, wherein the reinforcing member is bonded to the inner circumference of the disc.

4. The disc recording medium as claimed in claim 2, wherein the reinforcing member has a thermal expansive coefficient smaller than the disc.

5. The disc recording medium as claimed in claim 2, wherein the reinforcing member is bonded to the outer circumference of the disc.

6. The disc recording medium as claimed in claim 2, wherein the disc is bonded to the reinforcing member in a state of being heated into a higher temperature than the normal temperature.

7. The disc recording medium as claimed in claim 2, wherein the reinforcing member is bonded to the disc in a state of being cooled into a lower temperature than the normal temperature.

8. A disc recording medium having an outer circumference cooled in temperature lower than an inner circumference to obtain a residual stress acting as a tensile force.

9. A method of fabricating a disc recording medium, comprising the steps of:
   providing a disc and a reinforcing member having a thermal expansive coefficient different from that of the disc, the reinforcing member formed separately from the disc; and bonding the reinforcing member to the outer circumference of the disc to allow a radial tensile force to be applied to the disc.

10. The method as claimed in claim 9, wherein the step of bonding the disc and the reinforcing member allows the disc to be bonded with the reinforcing member in a state of being heated into a higher temperature than the normal temperature.

11. The method as claimed in claim 9, wherein the step of bonding the disc and the reinforcing member allows the reinforcing member to be bonded with the disc in a state of being cooled into a lower temperature than the normal temperature.

12. The method as claimed in claim 9, wherein the step of bonding the disc and the reinforcing member is performed in a state that the reinforcing member is suddenly cooled and the disc is slowly cooled.

13. A method of fabricating a disc recording medium, comprising the steps of:

pressurizing a molten substrate material to mold a disc; and suddenly cooling a part of the disc and, at the same time, slowly cooling the remaining part of the disc.

14. The method as claimed in claim 13, wherein the step of cooling the disc includes cooling the outer circumference of the disc suddenly.

15. The method as claimed in claim 14, wherein the step of cooling the disc includes cooling the outer circumference of the disc until a lower temperature than the normal temperature.

16. An apparatus with a stationary plate and a moving plate for fabricating a disc recording medium, comprising:

cooling means installed at any one of the stationary and moving plates, the cooling means cooling a part of the disc different from the rest of the disc in the cooling speed, the cooling temperature and the cooling order.

17. The apparatus as claimed in claim 16, wherein the cooling means cools the outer circumference of the disc suddenly.

18. The apparatus as claimed in claim 16, wherein the cooling means includes a cooling channel installed at any at least one side of the stationary plate and the moving plate and opposed to the outer circumference of the disc.

19. The apparatus as claimed in claim 16, wherein the cooling means includes a plurality of cooling channels installed in a concentric circle, the cooling channel at outer circumference flowing a cooling water which has a lower temperature than the temperature of a cooling water passing through the cooling channel at inner circumference.

20. The apparatus as claimed in claim 16, wherein the cooling means includes a plurality of cooling channels installed in a concentric circle, the cooling channel at outer circumference flowing rapidly cooling water relative to the cooling channel at inner circumference.

21. A disc recording medium having an inner and/or outer periphery cooled at a different rate than other portions of the medium to produce tensile stress.

22. A method of forming a disc recording medium, comprising:

molding substrate material into a disc; and cooling an inner and/or outer periphery of the disc at a different rate than other portions of the disc to produce tensile stress.

\* \* \* \* \*